United States Patent Office 3,159,193
Patented Dec. 1, 1964

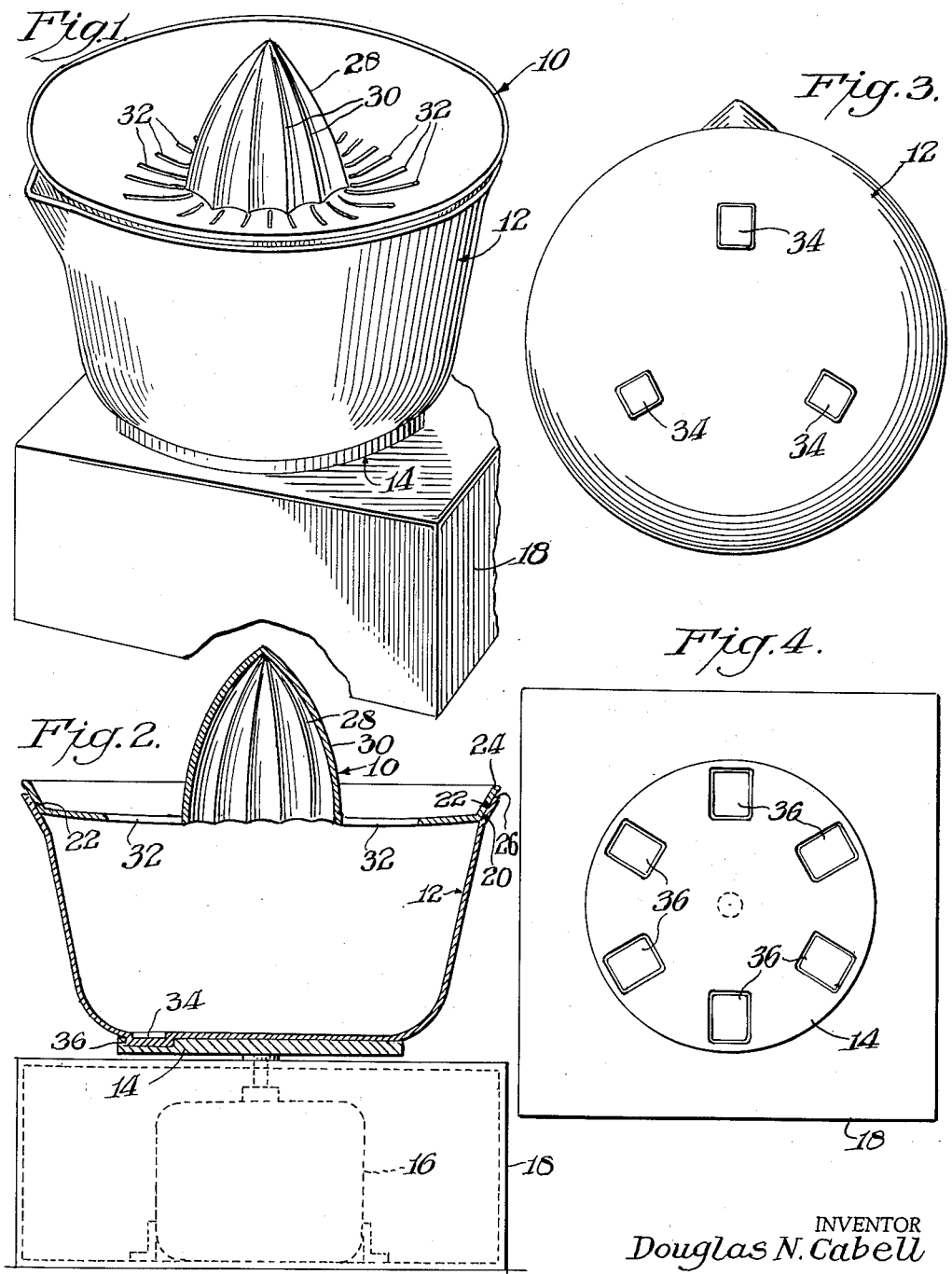

3,159,193
JUICE-EXTRACTING DEVICE
Douglas N. Cabell, Birmingham, Mich., assignor to
Ronson Corporation, a corporation of New Jersey
Filed Dec. 19, 1961, Ser. No. 160,505
9 Claims. (Cl. 146—3)

This invention relates to a device for use in conjunction with a kitchen appliance for extracting juice from citrus fruits, and it more particularly relates to such a device for use in conjunction with a mixer incorporating a power-driven turntable.

Various juice extracting attachments have been proposed for use in conjunction with kitchen mixers, however, these devices are fairly complicated and expensive because they incorporate a separate power take-off and relatively movable parts.

An object of this invention is to provide a relatively simple and economical juice-extracting device for use in conjunction with a kitchen appliance incorporating a power-driven turntable.

In accordance with this invention a concavely-dished cover is provided for the top of a bowl mounted upon the power-driven turntable of a kitchen appliance such as a mixer. A vertically disposed auger is mounted upon the axis of rotation of the cover and bowl for extracting juice from inverted halves of citrus fruit impaled upon it while the bowl and cover are rotated by the turntable. Interlocking means are provided upon the bottom of the bowl and turntable for transmitting rotational forces from the turntable to the bowl, and peripheral surfaces of the cover and bowl are engaged with each other for transmitting these rotational forces from the bowl to the auger. Holes may be provided in the bottom of the cover for draining and straining the extracted liquid into the bowl.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention associated with a mixing bowl and turntable;

FIG. 2 is a cross-sectional view in elevation taken through the embodiment shown in FIG. 1;

FIG. 3 is a bottom plan view of the bowl shown in FIG. 1; and

FIG. 4 is a top plan view of the base and turntable shown in FIGS. 1 and 2.

In FIGS. 1 and 2 a concavely-dished cover 10 is installed upon the top of bowl 12, which is mounted upon a turntable 14. Turntable 14 is rotated by an electric motor 16 installed within base housing 18, which is merely representative of any source of rotational power for turntable 14.

Concavely-dished cover 10 includes a peripheral surface 20 which is inserted and engaged within a corresponding peripheral surface 22 at the top of bowl 12 for transmitting rotational forces from bowl 12 to cover 10. Peripheral surface 20 is accordingly the outer surface of flange 24 of cover 10, and peripheral surface 22 is accordingly the inner surface of flange 26 of bowl 12. Cover 10 and bowl 12 are made of any material that provide sufficient frictional resistance to prevent them from slipping relative to each other when the juice-extracting operation is being performed. When cover 10 is made of a plastic such as Delrin, the illustrated mode of frictional engagement is sufficient to prevent cover 10 from slipping relative to a bowl 12 of practically any type of material including even glass while they are being actively used. Delrin is the trademark for a high melting, highly crystalline type of acetal resin polymer made by E. I. du Pont de Nemours & Co., Inc., Wilmington, Delaware. It has a polyoxymethylene molecular structure made by the polymerization of formaldehyde, and it may be generally described as a linear acetal consisting of unbranched polyoxymethylene chains of great length normally averaging more than 1,000 $CH_2O$ units. A vertically disposed auger 28 is disposed upon the axis of rotation of cover 10. It is representative of a variety of forms of such juice-extracting means, and it accordingly includes a series of flutes 30. A series of small holes 32, which are for example provided in the form of an arrangement of radial slots in cover 10, drain and strain the juice into bowl 12 and retain solid matter.

Bowl 12 is interlocked with turntable 14 for transmitting rotational forces to it by insertion of projections or lugs 34 shown in FIG. 3 upon the bottom of bowl 12 into corresponding indentations or recesses 36 shown in FIG. 4 upon the upper surface of turntable 14. As shown in FIGS. 3 and 4 three projections disposed at 120° angular intervals upon the base of bowl 12 cooperate with six corresponding indentations disposed 60° angular intervals upon the surface of turntable 14 to facilitate convenient engagement of the bowl with the turntable without the necessity of an undue amount of hunting.

Halves of citrus fruit are very conveniently squeezed upon this unit by merely installing concavely-dished cover 10 upon the top of a mixing bowl 12 which may be conveniently provided in the form of a standard mixing bowl for mounting upon a power-driven turntable in the type of kitchen mixing appliance described in commonly assigned copending application Serial No. 152,872, filed November 16, 1961. The adaptation of such an appliance for juicing is accordingly remarkably facilitated in extremely economical manner by the use of a single unitary cover, which engages the top of a type of bowl provided for general mixing functions with such an appliance. However, if desired, a separate bowl 12 particularly designed for juicing purposes can be utilized in conjunction with concavely-dished cover 10.

What is claimed is:

1. A device for extracting juice from citrus fruit in conjunction with a kitchen applicance incorporating a power-drive turntable, said device comprising a bowl for disposition upon said turntable, interlocking means upon the bottom of said bowl and said turntable for transmitting rotational forces from said turntable to said bowl, a concavely-dished cover for the top of said bowl, a peripheral surface of said cover engaging a peripheral surface at the top of said bowl to lock said cover upon said bowl against relative rotation, and a vertically-disposed auger means upon said cover mounted upon the axis of rotation of said cover and bowl for extracting juice from inverted halves of citrus fruit impaled upon it while said bowl and engaged cover are rotated together by said turntable.

2. A device as set forth in claim 1 wherein strainer means are provided in said concavely-dished cover for separating juice from solid matter.

3. A device as set forth in claim 1 wherein said peripheral surface of said bowl is an inner surface that is outwardly inclined relative to the inner wall of said bowl, and said peripheral surface of said cover being correspondingly inclined and sized to fit within said inner surface of said bowl whereby a force applied downwardly upon said cover helps maintain it locked upon said bowl.

4. A device as set forth in claim 1 wherein said interlocking means comprises projection and indentation means.

5. A device as set forth in claim 4 wherein said projections are mounted upon the base of said bowl, and said indentations are disposed upon the upper surface of said turntable.

6. A device as set forth in claim 5 wherein three of said projections are disposed at 120° angular intervals upon the base of said bowl, and six of said indentations are disposed at 60° angular intervals upon the surface of said turntable.

7. A device for extracting juice from citrus fruit in conjunction with a kitchen appliance incorporating a power-driven turntable and a bowl mounted upon it, said device comprising a concavely-dished cover for the top of said bowl, a peripheral surface of said cover being provided for engagement with a peripheral surface at the top of said bowl to lock said cover upon said bowl against relative rotation, and a vertically disposed auger means mounted upon said cover and concentrically disposed with respect to the axis of rotation of said cover for extracting juice from halves of citrus fruit impaled upon it while said cover is engaged upon and rotated together with said bowl.

8. A device as set forth in claim 1 wherein strainer means are provided in said concavely-dished cover for separating juice from solid matter.

9. A device as set forth in claim 2 wherein said strainer means comprises radially-disposed slots in said concavely-dished cover.

References Cited by the Examiner

UNITED STATES PATENTS

| 1,993,337 | 3/35 | Crowe | 146—3.7 |
| 2,010,491 | 8/35 | Kaefer et al. | 146—3.7 |
| 2,212,328 | 8/40 | Scurlock | 146—3.5 |

FOREIGN PATENTS

| 327,663 | 3/58 | Switzerland. |

J. SPENCER OVERHOLSER, *Primary Examiner.*

CARL W. ROBINSON, *Examiner.*